United States Patent [19]

Conley

[11] 4,346,412
[45] Aug. 24, 1982

[54] READ SIGNAL PROCESSING CIRCUIT

[75] Inventor: Bobby E. Conley, Yukon, Okla.

[73] Assignee: Magnetic Peripherals, Inc., Minneapolis, Minn.

[21] Appl. No.: 256,158

[22] Filed: Apr. 21, 1981

[51] Int. Cl.³ ........................... G11B 5/09; G11B 5/02
[52] U.S. Cl. ......................................... 360/46; 360/67
[58] Field of Search ..................................... 360/46, 67

[56] References Cited
U.S. PATENT DOCUMENTS
4,314,289  2/1982  Haynes .................................. 360/46

Primary Examiner—Vincent P. Canney
Attorney, Agent, or Firm—Edwin H. Crabtree

[57] ABSTRACT

A read signal processing circuit for a magnetic storage disk. The processing circuit used to accomodate intersymbol inference and base line noise problems of a magnetic recording code having minimum to maximum flux reversal time span ratio of 3-10. The circuit receives an amplified analog read signal and outputs a binary reconstruction of the original encoded write signal.

7 Claims, 4 Drawing Figures

READ SIGNAL PROCESSING CIRCUIT

BACKGROUND OF THE INVENTION

This invention relates generally to a signal processing circuit for a magnetic storage disk and more particularly but not by way of limitation to a read signal processing circuit for receiving an amplified analog read signal from the disks read-write head.

Heretofore, read signal processing circuits have reduced delayed distortion using linear phase filtering and lattice compensation of the signals differentiated phase characteristics. None of the prior art read signal processing circuits employ the unique features and advantages of the subject processing circuit described herein.

SUMMARY OF THE INVENTION

The subject invention provides an improved processing circuit for converting an amplified analog signal from a read-write head of a magnetic storage disk to a pulse transition data signal. This improvement in conditioning the signal allows data to be stored on magnetic storage disks at greater bit density.

The processor accomodates intersymbol interference and base line noise related to a magnetic code having a minimum to maximum flux reversal time span ratio of 3 to 10.

The processor uses a transversal filter type of pulse slimmer and a base line rejection circuit whose clip level varies to follow a fixed portion of the difference between the average or base line level and the instantaneous peak level. This eliminates the problem of recording codes which exacerbate base line problems. The transversal filter is used to slim the analog read signal and uses two delay units and a weighted summer whose delays and summing weights are chosen to provide the best compromise between resolution enhancement and amplitude loss to allow a partial correction of the pulse asymmetry.

The read signal processing circuit for a magnetic storage disk includes a pulse slimmer transversal filter for receiving an analog read signal for slimming the signal. A base line clipper with variable threshold is connected to the transversal filter for receiving the slimmed signal and inserting an electronic base line in the signal and clipping the slim signal between the base line and a threshold level. The clipped base line signal is then converted to a pulse transition data signal using a standard common dual channel high and low resolution approach to latching the data polarity at the proper time it is used.

The advantages and object of the invention will become evident from the following detailed description of the drawings when read in connection with the accompanying drawings which illustrate preferred embodiments of the invention.

DETAILED DESCRIPTION OF THE DRAWINGS

Figure 1:
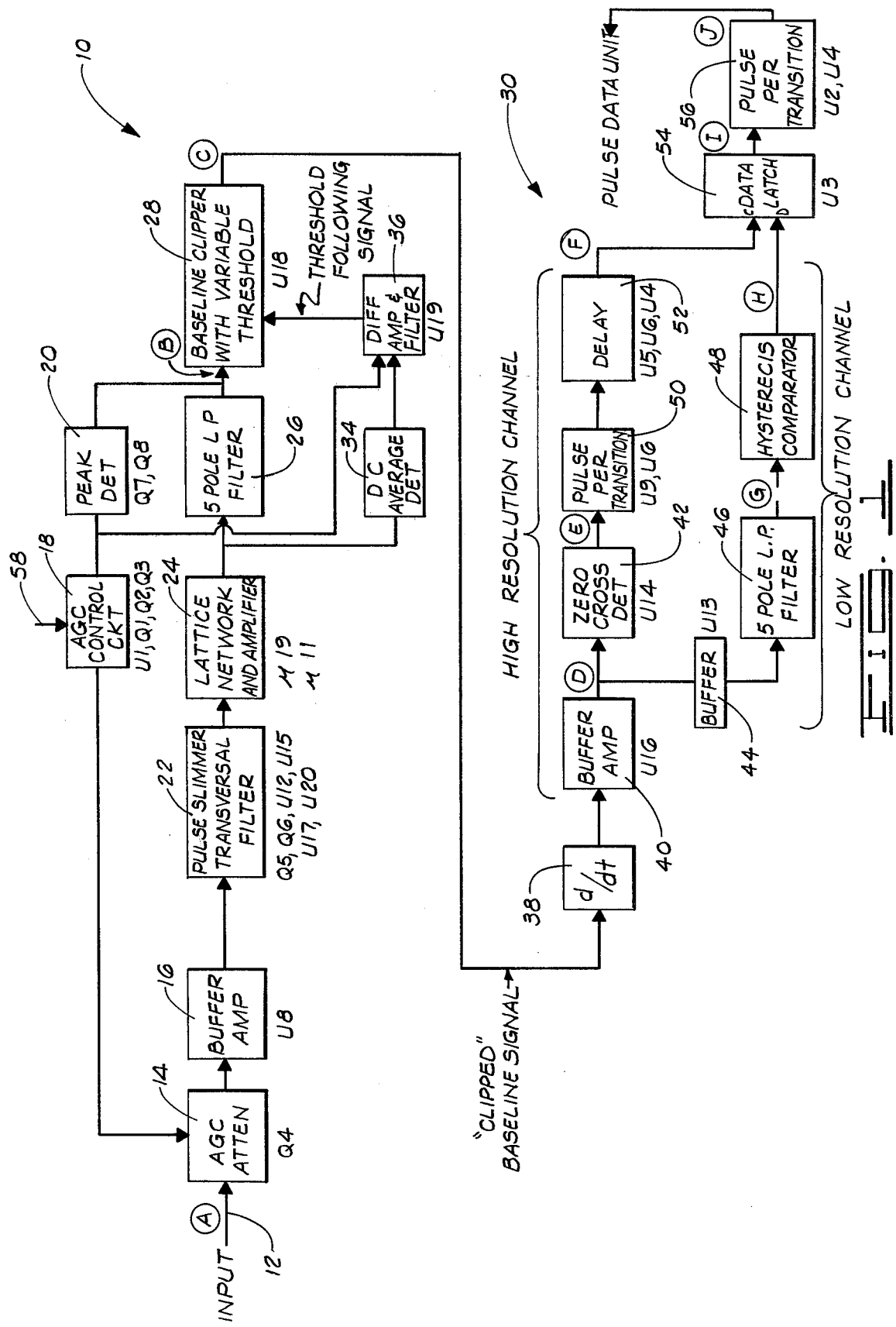
FIG. 1—illustrates the read signal processing circuit block diagram.
Figure 2:
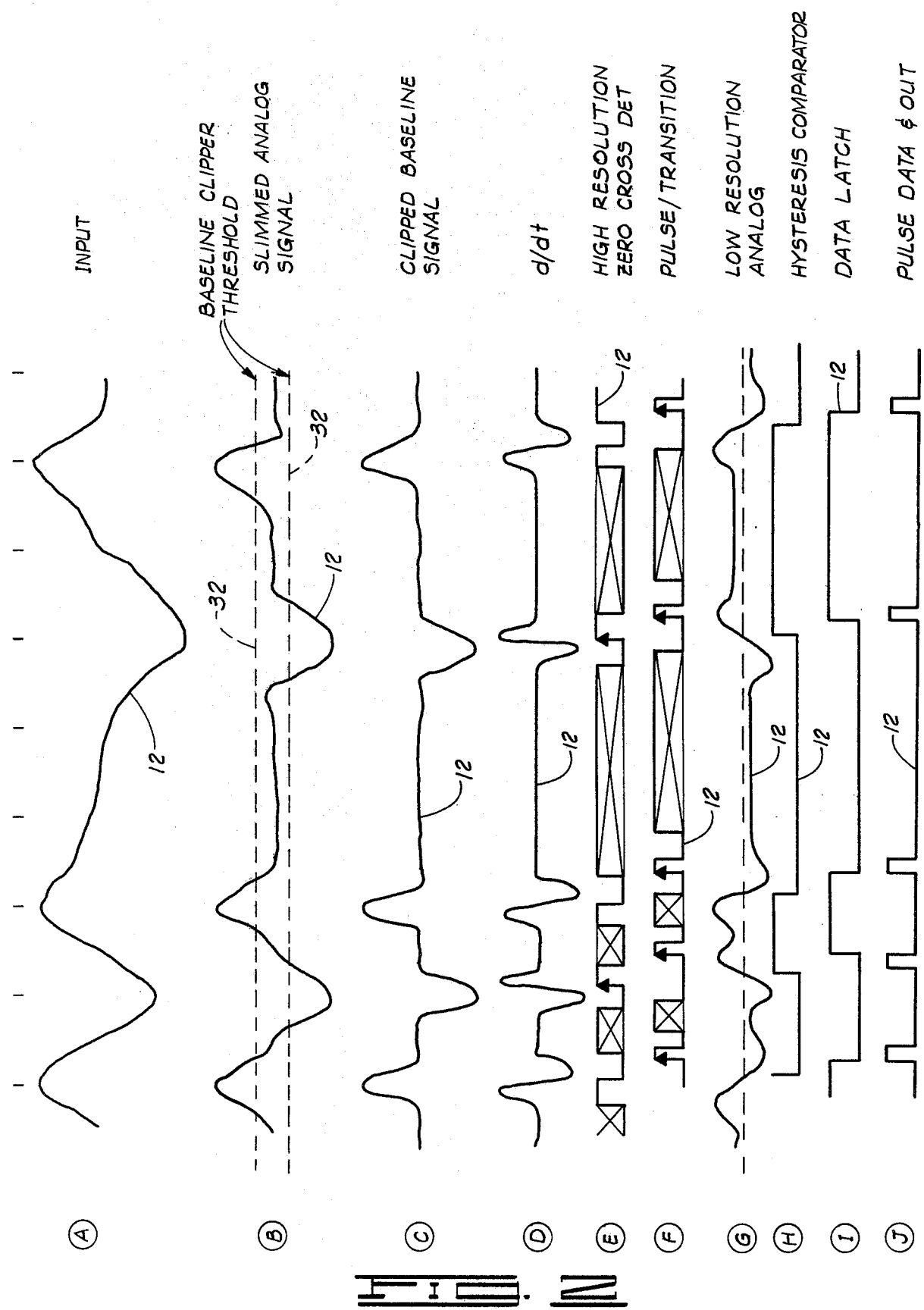
FIG. 2—illustrates the read signal processing signals as they are preconditioned in the read signal processing circuit.

In FIG. 1 a block diagram of the read signal processing circuit is shown and designated by general reference 10. The circuit 10 receives an amplified analog read signal 12 which is shown in FIG. 2 and designated by the alphabetical character A on the block diagram in FIG. 1. The analog read signal 12 is received from a read-write head and pre-amp of a magnetic storage disk unit. The head and disk unit are not shown in the drawings. In FIG. 1 and FIG. 2, the analog signal 12 is shown being conditioned as it is transmitted through the circuit 12 with the various forms of the read signal 12 designated by characters from A through J to produce in the end a pulse transition data signal which is a binary reconstruction of the original encoded write signal.

Each of the components shown in the circuit 10 is FIG. 1 are titled by name and are further designated by individual part numbers used by the assignee of the subject application such as "Q4" for an automatic gain attenuator and "U8" for a buffer amplifier. It should be appreciated that each of the elements of the circuit 10 are standard electrical circuit equipment made by different manufacturers and well known to those skilled in the art related to peripheral equipment used in the computor industry.

The analog input signal 12 is received by an automatic gain control attenuator 14 where it is transmitted to a buffer amplifier 16. The automatic gain control attenuator 14 is controlled by an automatic gain control circuit 18 and a peak signal detector 20. The detailed circuitry of the automatic gain control circuit 18 is not discussed because here again, this type of circuit is common in use and there are numerous ways of wiring this type of control. The signal 12 is transmitted from the buffer amplifier 16 to a pulse slimmer transversal filter 22 which will be further described under FIG. 3. From the transversal filter 22 the signal 12 is sent to a standard lattice network and amplifier 24 prior to receipt by a 5 pole low pass filter 26. The signal 12 is slimmed by the filter 22 as shown in FIG. 4 and in FIG. 2 as character B. At this point the signal 12 is transmitted to a base line clipper with a vaiable threshold 28. The base line clipper with variable threshold 28 inserts an electric base line in the signal. A threshold is derived from the average value of the signal 12 and a peak value. This threshold is nominally 30% of the peak difference between the average value and the peak value. This will be further described under FIG. 4. From the base line clipper 26 the clipped base line signal 12 shown in FIG. 2 as character C is transmitted to a commonly used dual channel high and low resolution circuit. This circuit is designated as general reference numeral 30 and provides means for producing a pulse transition data signal designated by alphabetical character J.

To obtain a baseline clipper threshold designated by number 32 shown in FIG. 2 and FIG. 4, a DC average detector 34 is connected to the lattice network and amplifier 24 with the detector 34 connected to a differential amplifier and filter 36. The amplifier and filter 36 is driven by the automatic gain control circuit 18 for producing a threshold following signal to the baseline clipper 26. Since the nature of a recording code having a minimum to maximum flux reversal time span ratio of 3 to 10 used on the magnetic storage disk tends to exacerbate baseline problems, the baseline clipper 28 with the variable threshold 32 is employed to accomodate rapid changes in the modulation envelope as shown in FIG. 4 and designated as a slimmed signal 12. By the use of the clipper 26, a fixed portion of the difference between the average level, or base line and the peak level of the slimmed analog read signal 12 received from transversal filter 22 is derived and a signal 12 designated by an output in FIG. 4 is derived and shown in FIG. 2 as the signal C. The clipped signal 12 is then sent through a standard differentiator 38 and then to a buffer amplifier 40. The differentiated signal 12 is designated by alphabetical character D. The amplified signal 12 from buffer amplifier 40 is then introduced to a standard zero crossing detector 42 in the high resolution channel and to a buffer 44 in the low resolution channel.

In the low resolution channel, the signal 12 is sent to a 5 pole low pass filter 46 and then applied to a hystersis comparator 48. The low resolution analog signal 12 is designated by character G in FIG. 1 and FIG. 2. The signal 12 received from the hysteresis comparator 48 is designated by H and shown in FIG. 2.

The high resolution zero cross detector signal 12 in the high resolution channel is shown alphabetical character E in FIG. 1 and shown in FIG. 2. This signal 12 is received in a standard pulse transition circuit 50 and then sent to a delay circuit 52 where a signal is produced and shown as alphabetical character F in FIG. 1 and shown in FIG. 2 as a pulse transition signal. The signal 12 is then received in a data latch 54 as a clock input. The signal H from the hysteresis comparator 48 is received as a data input. From the data latch 54, a data latch signal is received and designated by alphabetical character I and shown in FIG. 2. The signal 12 is then sent through a pulse transition circuit 56 which produces the desired pulse data out signal 12 prior to being sent to a read-write large scale integrated circuit.

Referring back to the read signal processing circuit 10, it should be noted that the automatic gain control circuit 18 receives a hold signal 58 during a write mode or an imbedded servo zone. In this case, the circuit 18 is disabled and held at a previous value.

Figure 3:
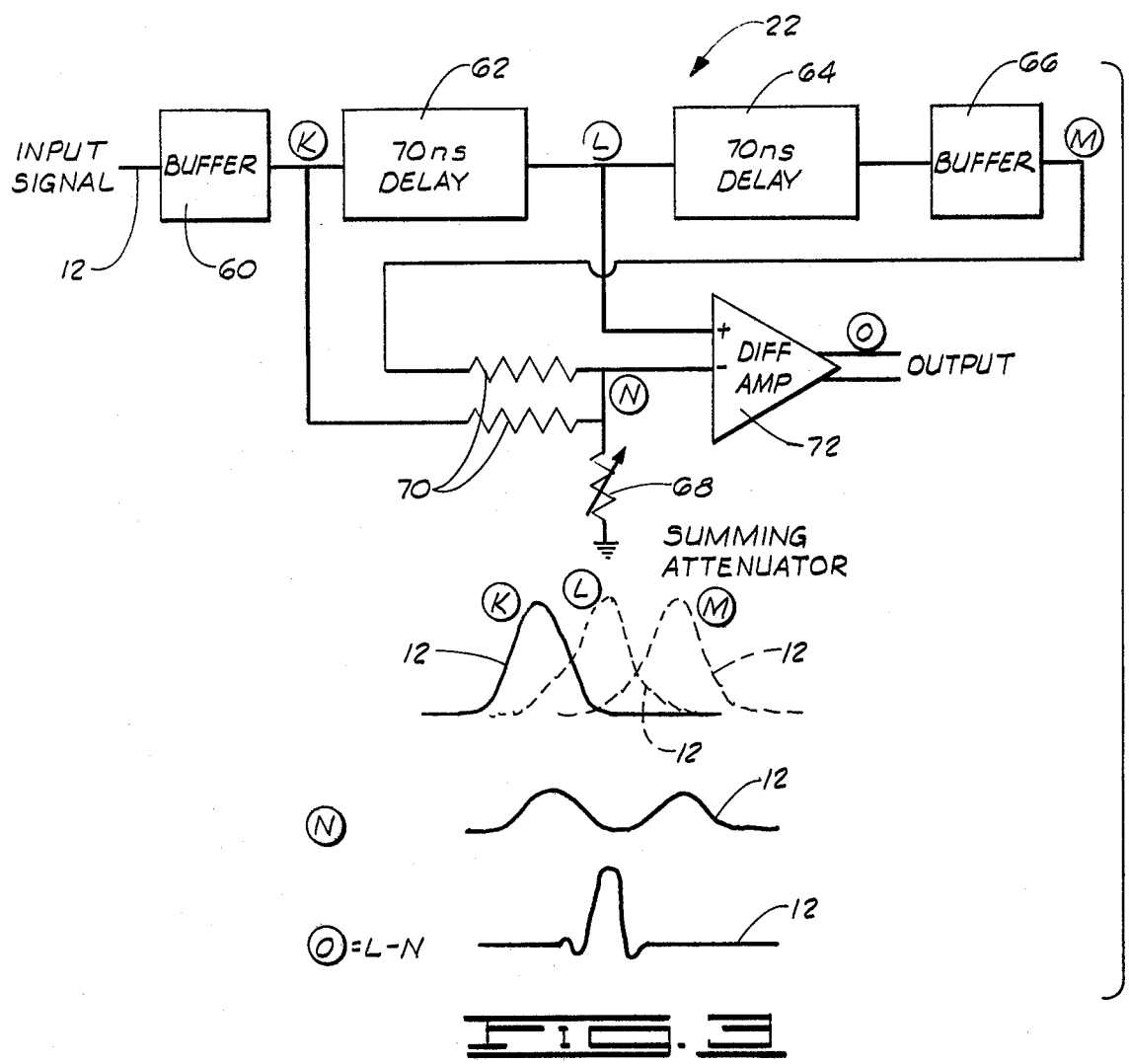
FIG. 3—illustrates the circuit of the pulse slimmer transversal filter.
Figure 4:
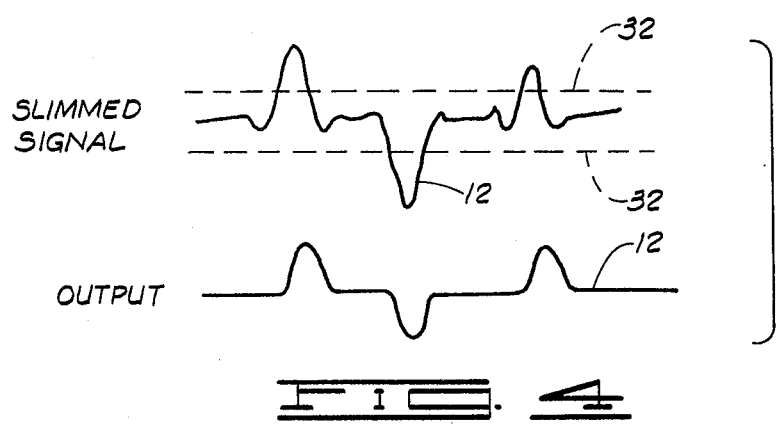
FIG. 4—illustrates the slimmed signal and the output of the slimmed signal from the base line clipper with variable threshold.

In FIG. 3 the pulse slimmer transversal filter 22 is shown in more detail and includes a buffer 60. From the buffer 60, the input signal 12 is shown and designated by alphabetical character K. The signal is then received by a 70 nano second delay 62 which produces a delayed signal L. The signal is then sent to an additional 70 nano second delay 64 and then to a buffer 66 producing an additional delayed signal M. The original signal K and the delayed signal M are then fed through a pair of resistors 70 and through a summing attenuator 68 to produce a signal N. This signal N is fed into the negative side of a differential amplifier 72. The delayed signal L is fed into the positive side of the amplifier 72 and the two signals produce and output signal 0. The output signal 0 is equal to the signal L less the signal N. In this unique way, the output signal 0 provides a compromise between resolution enhancement and amplitude loss and allows for a partial correction of the pulse asymmetry thereby producing a slimmed analog read signal.

The 70 nano second delays 62 and 64 are actually a tapped (adjustable) delay line which is a nominal 70 nano second but may be in a specific instance at 60, 65, 70, 75 or 80 nano seconds for this particular disk system.

In a disk system with a different read-write head and different media, the optimum delay may be quite different and is in fact a portion of the pulse width of the so-called "isolated pulse" produced by the head media combination being used.

As mentioned above, the slimmed signal 12 is then introduced to the lattice network and amplifier filter 24 prior to introduction into the base line clipper 26. Once the slimmed analog read signal 12 has been received to the base line clipper 26 and clipped, the signal 12 then has been conditioned to be introduced to the high and low resolution channel 30.

Changes may be made in the construction and arrangement of the parts or elements of the embodiments as disclosed herein without departing from the spirit or scope of the invention as defined in the following claims.

I claim:

1. A read signal processing circuit for a magnetic storage disk, the circuit receiving an amplified analog read signal from the disk's read-write head and outputting a binary reconstruction of the original encoded write signal, the circuit comprising:

a pulse slimmer transversal filter for receiving the analog read signal and slimming the signal;

a base line clipper with variable threshold connected to the transversal filter for receiving the slimmed signal and inserting an electronic base line in the signal and clipping the slimmed signal between the base line and a threshold level; and means for converting the clipped base line signal to a pulse transition data signal.

2. The circuit as described in claim 1 wherein the transversal filter includes a pair of delays and a weighted summing attenuator connected to a differential amplifier for producing the slimmed signal.

3. The circuit as described in claim 1 further including an automatic gain control circuit, a signal peak detector, a DC average detector, and a differential amplifier and filter all connected to the transversal filter and base line clipper for providing a threshold following signal to the base line clipper.

4. The circuit as described in claim 3 further including an automatic gain control attenuator and buffer amplifier connected to the automatic gain control circuit and the transversal filter for receiving the analog read signal prior to transmitting the signal to the transversal filter.

5. The circuit as described in claim 1 further including a lattice network and amplifier and a low pass filter connected between the transversal filter and the base line clipper.

6. A read-write processing circuit for a magnetic storage disk, the circuit receiving an amplified analog read signal from the disk's read-write head and outputting a binary reconstruction of the original encoded write signal, the circuit comprising:

an automatic gain control attenuator for receiving the amplified analog read signal;

a buffer amplifier connected to the automatic gain control attenuator;

a pulse slimmer transversal filter connected to the buffer amplifier and slimming the signal;

a lattice network and amplifier connected to the transversal filter for receiving the slimmed analog signal;

a low pass filter connected to the lattice network and amplifier for receiving the amplified slimmed signal;

a base line clipper with variable threshold connected to the low pass filter for receiving the slimmed signal and inserting an electronic base line in the signal and clipping the slimmed signal between the base line and a threshold level; and means for converting the clipped base line signal to a pulse transition data signal.

7. The circuit as described in claim 6 further including an automatic gain control circuit signal peak detector, a DC average detector, and a differential amplifier and filter connected to the automatic gain control attenuator and base line clipper for providing a threshold following signal to the base line clipper.

* * * * *